US012527608B2

(12) United States Patent
Heuer (10) Patent No.: US 12,527,608 B2
(45) Date of Patent: Jan. 20, 2026

(54) SCREW ELEMENT AND METHOD FOR ADDITIVE MANUFACTURE

(71) Applicant: MIMEO MEDICAL GmbH, Filderstadt (DE)

(72) Inventor: Frank Heuer, Filderstadt (DE)

(73) Assignee: MIMEO MEDICAL GmbH, Filderstadt (DE)

( * ) Notice: Subject to any disclaimer, the term of this patent is extended or adjusted under 35 U.S.C. 154(b) by 245 days.

(21) Appl. No.: 18/261,754

(22) PCT Filed: Jan. 13, 2022

(86) PCT No.: PCT/EP2022/050698
§ 371 (c)(1),
(2) Date: Jul. 17, 2023

(87) PCT Pub. No.: WO2022/157074
PCT Pub. Date: Jul. 28, 2022

(65) Prior Publication Data
US 2024/0216028 A1    Jul. 4, 2024

(30) Foreign Application Priority Data
Jan. 19, 2021    (DE) ..................... 10 2021 000 210.5

(51) Int. Cl.
*A61B 17/86*    (2006.01)
(52) U.S. Cl.
CPC ........ *A61B 17/863* (2013.01); *A61B 17/8635* (2013.01); *A61B 17/866* (2013.01)

(58) Field of Classification Search
CPC .................................................. A61B 17/863
See application file for complete search history.

(56) References Cited

U.S. PATENT DOCUMENTS

| 2005/0234561 A1 | 10/2005 | Nutt et al. |
| 2013/0053901 A1 | 2/2013 | Cormier et al. |
| 2015/0196336 A1 | 7/2015 | Whipple et al. |

(Continued)

FOREIGN PATENT DOCUMENTS

| CN | 110882414 A | 3/2020 |
| DE | 102017101348 A1 | 7/2018 |

(Continued)

OTHER PUBLICATIONS

International Search Report with English Translation for PCT/EP2022/050698, mailed May 31, 2022, nine pages.

(Continued)

*Primary Examiner* — Tessa M Matthews
(74) *Attorney, Agent, or Firm* — Nixon & Vanderhye P.C.

(57) ABSTRACT

A screw element and a process for manufacturing of the screw element for the fixation of bone components and bone fragments are disclosed including a shaft with a bone thread, and a longitudinal central axis extending along the shaft defining a distal direction and a proximal direction. The screw element further includes a head, and a neck area, and a tool attachment point is provided in the head. At least three cantilever elements are attached to the proximal end of the head and said cantilever elements extend in proximal direction beyond the proximal end of the head and are positioned mainly along the longitudinal central axis.

11 Claims, 6 Drawing Sheets

(56) References Cited

U.S. PATENT DOCUMENTS

| | | | |
|---|---|---|---|
| 2017/0165754 A1 | 6/2017 | Buller et al. | |
| 2018/0161072 A1* | 6/2018 | Heuer | A61B 17/7037 |
| 2019/0150989 A1 | 5/2019 | Biester et al. | |
| 2019/0167326 A1 | 6/2019 | Greenhalgh et al. | |
| 2019/0231535 A1 | 8/2019 | Gallagher et al. | |
| 2019/0343564 A1* | 11/2019 | Tempco | A61B 17/866 |

FOREIGN PATENT DOCUMENTS

| | | | |
|---|---|---|---|
| EP | 1287851 A1 | 3/2003 | |
| EP | 3530226 A1 | 8/2019 | |
| FR | 3052659 A1 * | 12/2017 | A61C 13/0013 |
| JP | 10130757 A | 5/1998 | |

OTHER PUBLICATIONS

Written Opinion of the ISA for PCT/EP2022/050698, mailed May 31, 2022, 13 pages.

* cited by examiner

SCREW ELEMENT AND METHOD FOR ADDITIVE MANUFACTURE

CROSS REFERENCE TO RELATED APPLICATIONS

The present application is a National Phase of International Application Number PCT/EP2022/050698 filed Jan. 13, 2022, which designated the U.S. and claims priority benefits from German Patent Application Number DE 10 2021 000 210.5 filed Jan. 19, 2021, the entire contents of each of which are hereby incorporated by reference.

STATE OF THE ART

Various osteosynthesis devices such as screw elements for the fixation of bone components and bone fragments are known in the prior art. Such bone screws are typically manufactured with CNC milling and turning machines. Special threated plates have to be provided for the special bone thread geometries and, above all, for the different diameters of the screw elements. This results in longer delivery times and higher costs. 3D printing offers a possible alternative to this, as all geometries can be manufactured without special tools, and thus without waiting for special tools. Much greater flexibility in geometry design is also enabled. Furthermore, far more than one hundred screw elements can be produced simultaneously in 3D printing, so that there is generally a significant cost advantage compared to conventional CNC manufacturing processes.

However, a major disadvantage of the 3D print manufacturing process is that the surfaces of the printed parts have a natural surface roughness, which is optimal for the growth of bone cells, but this also defines numerous micro-notches. These micro-notches negatively impact the fatigue strength of the printed parts. Furthermore, 3d-printed parts have a significant brittle material behavior, which is why different heat treatments are proposed to counteract this material behavior.

From the state of the art for implants, it can be seen that 3D printing is used to mass-produce disc replacement implants (cages), as here the printed geometries are mechanically oversized such that, despite the micro-notches, the minimum criteria for fatigue strength are achieved and a clinically safe situation can be assumed for these 3D printed cage implants. However, if bone screws are to be manufactured using 3D printing, significantly more stringent requirements must be met in terms of fatigue strength. Bone screws are subjected to continuous and recurring high bending loads. Therefore, suitable process steps must be conducted for this purpose, and these must be conducted in a strictly defined sequence so that, on the one hand, the material does not react in a brittle manner, and, on the other hand, the micro-notches can be removed. The state of the art lacks any information on the production of 3D-printed bone screws, in particular on the general production, post-processing and, above all, the sequence of post-processing steps so that clinically safe fatigue strength can be achieved.

Representation of the Invention

The object is solved by means of the screw element and the manufacturing process according to the invention presented herein.

An additive manufacturing process is to be used for the production. Additive manufacturing of metallic alloys, or 3D printing, uses the laser or electron beam melting process. All metallic alloys that are known and accepted as orthopedic implant materials are suitable as materials. These include, for example, titanium, cobalt-chromium and stainless-steel alloys. Preference will be given to the titanium alloy Ti6Al4V. Raw material particles or powders with a defined particle size are used for 3D printing. The particle size can be used to specify the component accuracy and the layer spacing during manufacturing.

3D printing machine manufacturers suggest an inclined placement in the 3D printing building space for the best result in terms of surface finish and accuracy. An inclined placement in the building space would require the screw element (1) according to the invention to be built up inclined in the 3D printer and a large number of lateral cantilever elements or support elements would have to be provided in order to achieve an optimum printing result. While this produces the best quality result, it is cost inefficient. On the one hand, significantly fewer screw elements fit into the printable space, and on the other hand, laterally attached cantilever elements can only be removed manually, i.e., by hand, and thus only in a cost-inefficient manner in series production with large quantities. This means that the best print result is counteracted by corresponding cost inefficiency in series production.

To make effective use of the building space and at the same time maximize the number of screw elements (1) that can be manufactured, it is advantageous if the screw elements (1) can be manufactured upright. However, this implies restrictions with regard to the manufacturable features and printable accuracies. To ensure that screw elements (1) can nevertheless be printed upright and cost-efficiently, various geometric features must be complied with and provided for.

Figure 1:
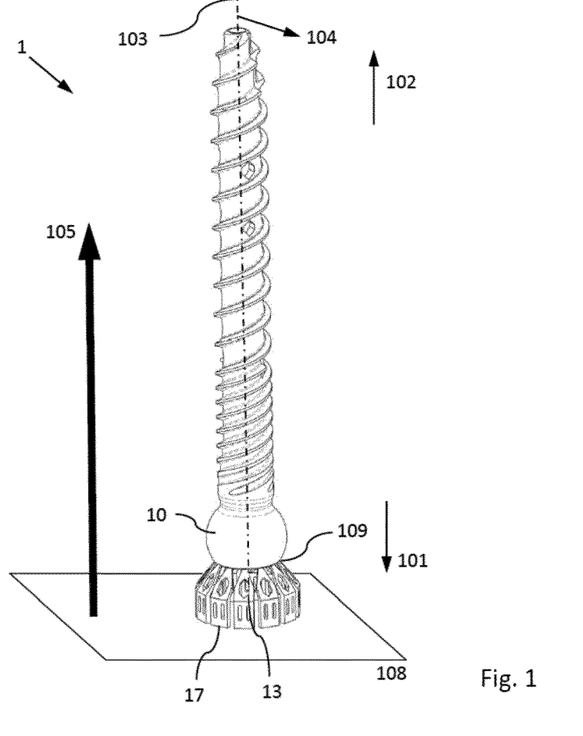
FIG. 1 an oblique view of the screw element according to the invention in upright orientation, FIG. 2 an oblique view from distal.
Figure 2:
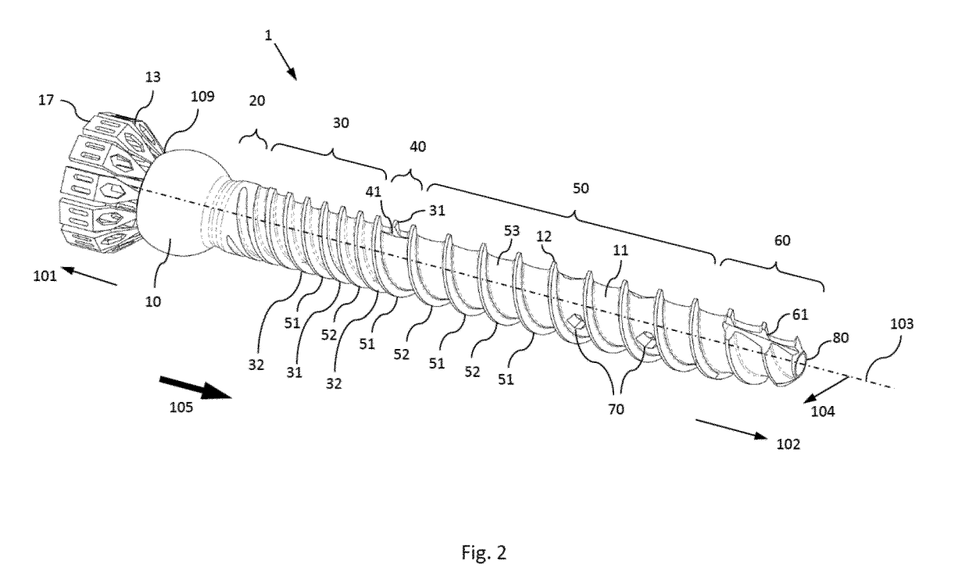
Figure 4:
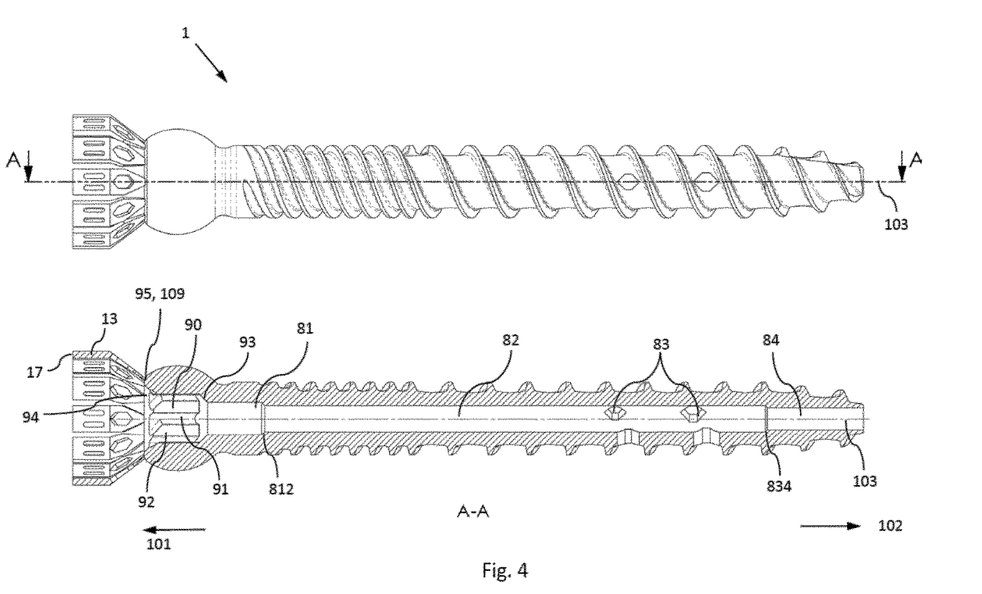
FIG. 4 side view and associated sectional view through the bone anchor according to the invention, FIG. 5 a step during the manufacturing process.

For the screw element (1) according to the invention, space-allocating coordinate references are defined, such as the proximal direction (101), the distal direction (102), which run along a central axis (103). Running outward from the Central axis (103), the radial extension (104) is defined (FIG. 1 and FIG. 2). The screw element (1) according to the invention is configured for the fixation of bone components and bone fragments and consists of a shaft (11) with a bone thread (12) and a longitudinal central axis (103) extending along the shaft (11) and the screw element (1) further comprises a head (10), a neck area (20) and a tool attachment point (90) provided in the head (10) (FIG. 4).

According to a preferred embodiment, at least three cantilever elements (13) are attached to the proximal end of the head (10, 109) and these cantilever elements (13) extend in proximal direction (101) beyond the proximal end of the head (10, 109). Thus, they are mainly positioned along the longitudinal central axis (103). The cantilever elements (13) are preferably integrally connected to the proximal end of the head (10, 109). The cantilever elements (13) may have any shape or geometry. For example, they may comprise plate, wire, beam or column elements or a combination thereof assembled together. In this context, the cantilever elements may at least partially provide an additional radial spacing to the screw element. The cantilever elements may have further connections with each other to form the cantilever elements as a composite. Furthermore, a ring-like or polygon-like arrangement of one or more formations is also possible. The task of the cantilever elements is to space the screw element (1) from a base plate of the 3D printer during the 3D printing process and to hold it at the same time. It is preferable if the free ends (17) of the cantilever elements (13) define a plane (108) and the screw elements (1) are given stability against tilting with the aid of this plane (108)

during additive manufacturing. For the screw element (1) according to the invention, a building direction (105) is defined for 3D printing which corresponds approximately to the direction of the central axis (103) and runs from proximal (101) to distal (102) and the building direction (105) matches the surface normal of the plane (108). Only in this combination of these features upright manufacturing is possible at all.

To prevent the entire outer surface of the head area (10) from having to be provided with cantilever elements (13), it is preferable if the tool attachment point (90) is open in the proximal direction (101) and opens into a concentric cone-like recess (94) and has an approximately right-angled cone angle. Thus, it is sufficient if the cantilever elements (13) are provided on a proximal ring structure (95, 109) along the diameter of the tool attachment point.

For the same reason, it is also important that the tool attachment point (90) is bounded in the distal direction (102) by a wall (93) and that this wall (93) extends as a cone radially inwards in increasing distal direction (102) and that the cone angle formed by the wall is less than 120°. Preferably, this wall (93) has an approximately rectangular cone angle. This wall (93) can thus be produced in 3D printing, taking into account the defined building direction (105). This means that cantilever elements for the base of the tool attachment point can also be omitted here. Removing any cantilever elements from this bottom surface (93) would be a great challenge because this bottom surface (93) is very difficult to reach for postprocessing. It is also advantageous if the tooth profiles (91) also open into this cone surface (93), so that these mouth points can be produced in the 3D printing process. Such a cone-like wall (93) at the base of the tool attachment point (90) could not be produced by CNC manufacturing processes or only with the greatest technical effort.

According to a preferred embodiment, a screw element (1) for the fixation of bone components and bone fragments is described, which consists of a shaft (11), a neck area (20) and a head (10) located in the proximal direction (101) and a tip (60) located in the distal direction (102). The head (10) is preferably formed as a lens, an inclined head or a spherical head. However, a combination of different curves and surfaces is also possible. The main feature of the head is that the head (10) has a larger outer diameter than the neck area (20). Preferably, the bone anchor has a tool attachment point (90) which is configured for introducing a torque. For minimally invasive treatment, it is advantageous if the bone anchor has a completely passing channeling opening (80) through which a surgical guide wire can be passed.

Bone screws which can be screwed to a bone are preferably used as screw elements (1). However, hooks, clamps, nails and other types of bone anchors may also be used. In the example of a screw element (1) given here, a bone screw with a shaft (11) and a bone thread (12) located on the shaft is shown. The thread (12) may have a finer toothing (30) proximally, at least in sections, which is more suitable for a harder cortical bone. It is preferable to have a distally tapering thread (60) with a cutting edge (61) at the bone anchor tip (60) so that the screw element (1) can self-tap into the bone when screwed in.

It is preferable if the screw element (1) is characterized in that the outer thread (12) can be zoned into a proximal thread area (30) adjacent to the neck area (20) and extending in the distal direction (102), and a distal thread area (50) adjacent thereto, and a distal tip area (60) adjacent thereto, and the distal thread area (50) merges into the proximal thread area (30) in a transition zone (40), and the proximal thread area (30) forms at least one further course of thread (31, 32) which forms at least one cutting edge (41) within the transition zone (40).

This cutting edge (41) provides a pre-cutting effect and does not cause space displacement in the bone. This is of clinical advantage, especially in weaker bone, because it may reduce the risk of fracture during implantation.

It is further preferable if at least one of the cutting edges (41, 61) is planar and aligned mainly in the radial direction (104). Alternatively, a concave or convex surface for generating the respective cutting edge is also possible.

Different thread tooth courses and arrangements are possible as bone threads. For example, a thread with one tooth at the distal region may merge into a double or triple thread in the proximal region. It is also possible to provide a double thread in the distal region, which merges into a quadruple or sixfold thread in the proximal direction (101). To simplify all figures, the preferred embodiment has been illustrated with a double thread in the distal region (50) and a quadruple thread at the proximal region (30).

In the case of weak bone, such as osteopenia or osteoporosis, it may be necessary to additionally augment the bone anchor. This may be done with bone cement. Bone cement is preferably a polymer consisting of at least two components mixed together and injected in a liquid or paste-like state. after a few minutes, the bone cement hardens in the bone to form a plastic and bonds with the sponge-like bone structure. A polymethyl methacrylate cement is usually applied. Alternatively, other media for delivery through the bone anchor are possible. It is possible that alternative media, such as pharmaceutically active media, or media containing cells, nutrients, or media serving as hereditary information carriers, or vaccines are administered through the bone anchor.

Optionally, the channeling (80) has at least one or more laterally extending openings (70) (FIG. 3) being connected with the channeling. Preferably, the openings are positioned circumferentially in a ring-like formation (71 or 72). With more than one circumferential ring-like opening formation (71 and 72), the openings have different opening cross sectional areas (710, 720) per formation. In the case of bone anchors (1) screwed into a bone, the lateral openings are connected with the surrounding bone tissue from the hollow chamber (80). They are configured to allow fluid injected into the bone anchor (1) to be delivered through the lateral openings into the surrounding tissue. A different cross-sectional area of the opening formations (710, 720) has the advantage that, due to the local pressure difference within the fluid, a similar volume flow is generated through all openings (71, 72). This is achieved because the openings (72) that are closer to the proximal direction (101) have a smaller cross-sectional area (720) than the openings (710) of the formation (71) that are further distal.

It is particularly advantageous for 3D printing if these lateral openings (70, 71, 72) are provided as polygons (700). Conventionally, such lateral openings (70) are drilled out concentrically. In 3D printing, concentric openings would create small overhangs, resulting in so-called dross formations (i.e., miniature dripstone-like formations). This would require manual post-processing, which is costly in volume production. Polygons offer an alternative and are thus the preferred embodiment. The inclined surface elements of a polygon form a roof-like structure. Slopes with a cone angle of about 90° to each other can easily be produced by printing without cantilever elements or dross formations.

Figure 3:
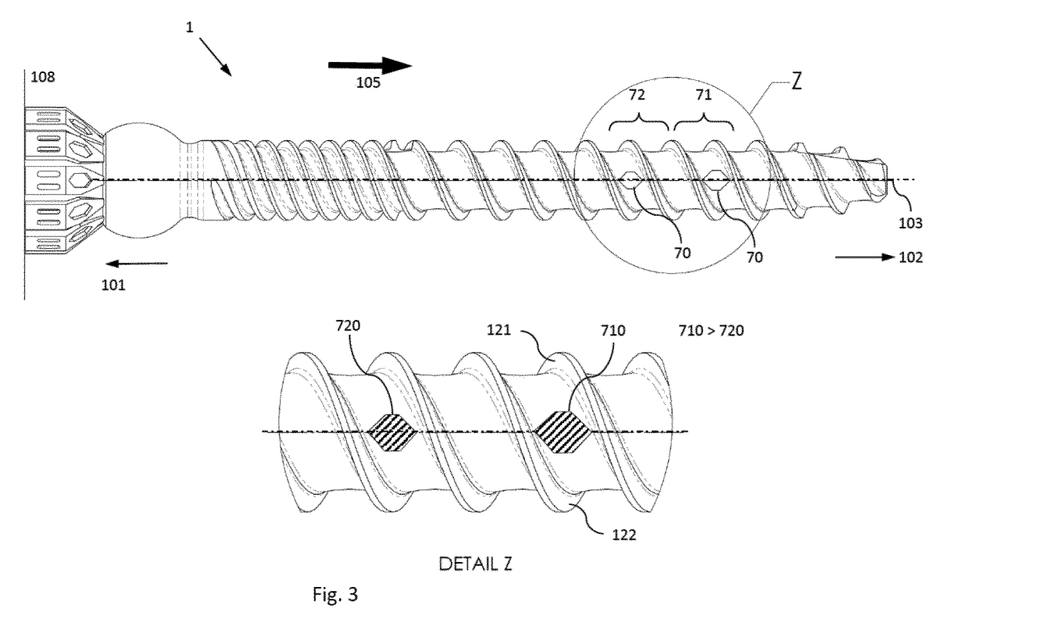
FIG. 3 a side view of the screw element according to the invention, and a detailed view of the lateral openings and thread flanks.

With 3D printing it is also possible to provide different roughnesses on the surface of the screw element (1). For example, it is possible to provide a greater surface roughness on the surfaces of the thread flanks (12) that are directed in the proximal direction (121) than on the surfaces of the same thread flanks that are directed distally (122) (FIG. 3). Higher roughness on the thread flanks in the proximal projection direction (121) have the advantage of generating higher friction between the bone and the screw element in the pull-out direction and giving the screw element significantly higher pull-out strength. Smoother thread flanks in the distal projection direction (122) have the advantage that the screw element (1) can then still be easily screwed into the bone.

A process for manufacturing a screw element (1) according to any of the preceding claims, comprising the steps:
  a. Providing raw material particles of a Ti6Al4V alloy.
  b. Additive building of the screw element (1) according to the invention by means of a 3D printing process, which joins the raw material particles together in three dimensions.
  c. Stress relief heat treatment of the screw element (1) at a temperature of at least 500° C., but not greater than 840° C., with a hold time of at least one hour, but less than 6 hours.
  d. Removing the cantilever elements (13) from the proximal head area (109) (FIG. 5).
  e. Second heat treatment of the screw element (1).
  f. Removing incompletely joined raw material particles.

For the stress relief heat treatment, it is preferable if a temperature of preferably between 550° C. and 800° C., preferably between 550° C. and 750° C., preferably between 600° C. and 720° C., is applied for the hold time during the stress relief heat treatment of the screw element (1).

The cantilever elements (13) may be removed manually or mechanically. Any cutting or separating processes, such as grinding, milling, turning, or EDM and wire-cut EDM, are suitable for this purpose.

Three different processes are appropriate for the second heat treatment of the screw element (1). With the second heat treatment, the material structure is optimized with regard to the originally brittle behavior so that a certain material toughness can be set. For this purpose, there are different temperature ranges and ambient conditions at which the best material properties can be set. An option of the second heat treatment of the screw element (1) is the generation of an argon atmosphere, at a temperature between 900° C. and 940° C., preferably between 910° C. and 930° C., and the screw element (1) is exposed to a pressure of at least 900 bar, preferably of at least 950 bar, and for the temperature and the pressure a hold time of at least one hour but less than 4 hours is applied. Another option of the second heat treatment of the screw element (1) is to generate an argon atmosphere at a temperature of at least 920° C. but less than 1050° C., for a hold time of at least one hour but less than 4 hours. Another option of the second heat treatment of the screw element (1) is to generate a temperature of at least 820° C. but less than 920° C., and to maintain it for a hold time of at least one hour but less than 4 hours.

The heat treatments (stress relief heat treatment and the second heat treatment to optimize the material structure) alone are not sufficient to increase the fatigue strength. A proper fatigue strength can only be achieved if the material has the right properties, and the surfaces are free of micro-notches. For this reason, the process for producing the screw element includes the step "removal of incompletely joined raw material particles". It is preferable to use two different removal processes that complement each other. The removal of incompletely joined raw material particles shall therefore comprise the following:

g. Removing incompletely joined raw material particles by means of a mechanical removal process, and
  h. Removing incompletely joined raw material particles by means of a chemical removal process.

For the automation of serial production, the mechanical abrasive process can be conducted by means of a blasting abrasive at a minimum application pressure of 2 bar and a minimum application duration of 5 min, whereby sharp-edged blasting abrasive, such as corundum, is used, and the blasting abrasive has a particle size between 0.05 mm and 0.25 mm, but preferably a particle size between 0.07 mm and 0.15 mm. Alternatively, the mechanical abrasive process may also be conducted by means of a coarse barrel finishing or vibratory finishing process.

The chemical removal process is conducted by means of a chemical pickling or etching process. A chemical process has the advantage that even contours and geometric features that cannot be reached or accessed from the outside can still be reworked or removed. Thus, for example, the inner contour of the channeling (80) can also be cleared of incompletely joined particles. The chemical ablation process may be supported electro-galvanically and/or by mechanically induced vibrations.

The fatigue strength of components subjected to bending loads may be additionally increased by generating residual compressive stresses on the surfaces. This may be achieved by a suitable blasting abrasive. It is therefore preferable if, at the end of the process, the surfaces of the screw element (1) are solidified by means of a blasting abrasive, wherein a minimum application pressure of 2 bar and a minimum application duration of 5 min are maintained, wherein spherical blasting abrasives are used, such as ceramic balls, and the blasting abrasive has a particle size of between 0.05 mm and 0.25 mm, but preferably a particle size of between 0.07 mm and 0.15 mm.

DESCRIPTION OF THE PREFERRED EMBODIMENTS

FIG. 1 shows that the building direction (105) of the screw element (1) according to the invention corresponds approximately to the direction of the central axis (103) and runs from proximal (101) to distal (102). Furthermore, the building direction (105) matches a surface normal (108). The advantages have already been described above.

FIG. 2 shows an embodiment of a screw element (1) consisting of a head area (10), a neck area (20) and a shaft area (11) with bone thread (12). It can further be seen that the outer thread (12) can be zoned into a proximal thread area (30) adjacent to the neck area (20) and extending in a distal direction (102), and a distal thread area (50) adjacent thereto, and a distal tip area (60) adjacent thereto, and the distal thread area (50) merges into the proximal thread area (30) in a transition zone (40), and the proximal thread area (30) forms at least one further course of thread (31, 32) which forms at least one cutting edge (41) within the transition zone (40).

Another cutting edge (61) is formed at the distal tip area (60). Optimally, the respective cutting edge (41, 61) is mainly planar in the radial direction. Other surface geometries with convex or concave areas are also possible. Alternatively, patterns which recur in the circumferential direction and have a precutting effect, such as fluting or teeth, are also possible.

FIG. 2 shows an embodiment of a screw element (1) which forms two separate thread teeth (51 and 52) in the distal area (50). This is a so-called double thread, wherein a larger pitch is achieved with the same number of thread teeth compared to a single thread. This reduces the number of turns required to implant such a screw element (1). The thread core or thread valleys (53) is located between the courses of thread. In the proximal area (30), an additional thread tooth (31, 32) is provided between each of the distal courses of thread (51, 52). The proximal courses of thread (31, 32) have the same pitch as the distal courses of thread (51 and 52). Two cutting edges (41, 42) are formed in the transition area (40), wherein the second cutting edge (42) cannot be shown due to the view. It is the beginning (not shown here) of the second proximal course of thread (32). The cutting edges (41, 42) have the great clinical advantage that fractures during implantation can be prevented in the future with such screw elements (1). If, alternatively, a different thread is provided, the number of cutting edges is increased or reduced accordingly.

FIG. 3 shows a preferred embodiment of a screw element (1) in which the lateral fenestration openings (70) are designed as polygons. It is also shown that the lateral openings (70) are arranged in a ring-like formation (71 and/or 72) in the circumferential direction and, in the case of more than one ring-like formation (71 and 72) in the circumferential direction, the openings (70) have different opening cross sectional areas (710, 720) per formation. Optimally, the opening cross-sectional area (710) of the distal formation (71) is larger than the opening cross-sectional area (720) of the proximal formation (72).

FIG. 4 shows a sectional view of the screw element (1). The interior of the head area (10) and the continuous channeling (80) can be seen. The main feature of the head is that the head (10) has a larger outer diameter than the neck area (20). Preferably, the bone anchor has a tool attachment point (90) which is suitable for applying torque. The torque for screwing in the bone anchor can thus be applied directly via the tool attachment point. This tool attachment point may have any profile (91, 92), such as a multi-tooth round, hexagon socket, cross recess, a simple slot or other toothing. In the preferred embodiment, the tool attachment point (90) is positioned at the proximal end (101) and is bounded in the distal direction (102) by a wall (93). This wall (93) is formed as a slope or cone which extends radially inwards in increasing distal direction (102) and the cone angle formed by the wall is less than 120°. Optimally, the cone angle is approximately rectangular. It can also be seen that the tool attachment point (90) is open in the proximal direction (101) and opens into a concentric cone-like recess (94) and has an approximately right-angled cone angle.

FIG. 4 also shows the course of the channeling opening (80). It is advantageous if a section (81) with a slightly larger diameter is provided proximally, in which an application cannula can be inserted. The central section of the channeling (82) with a diameter is positioned adjacent to this. The lateral openings (70) open into the channeling (82) through corresponding opening points (83). It is preferable if the channeling diameter is reduced towards the distal (102) in a distal channeling section (84). The transitions (812, 834) between the different channeling diameters ideally have a cone angle of less than 120°, preferably they are approximately at right angles so that they can also be optimally produced for 3D printing.

Figure 5:
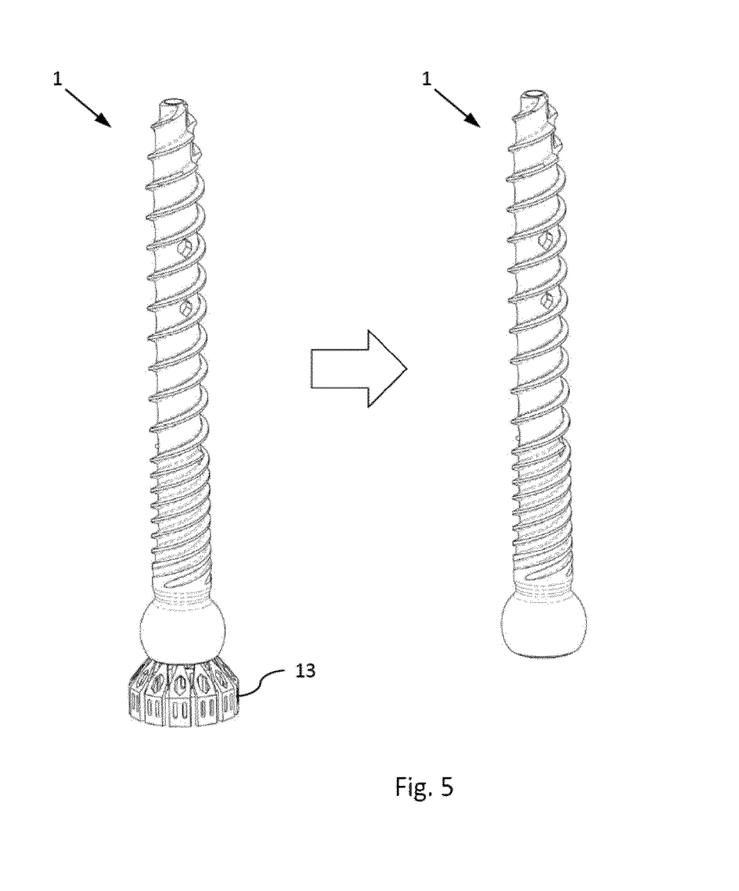

FIG. 5 shows a step in the manufacturing process in which the cantilever elements (13) are removed.

Figure 6:
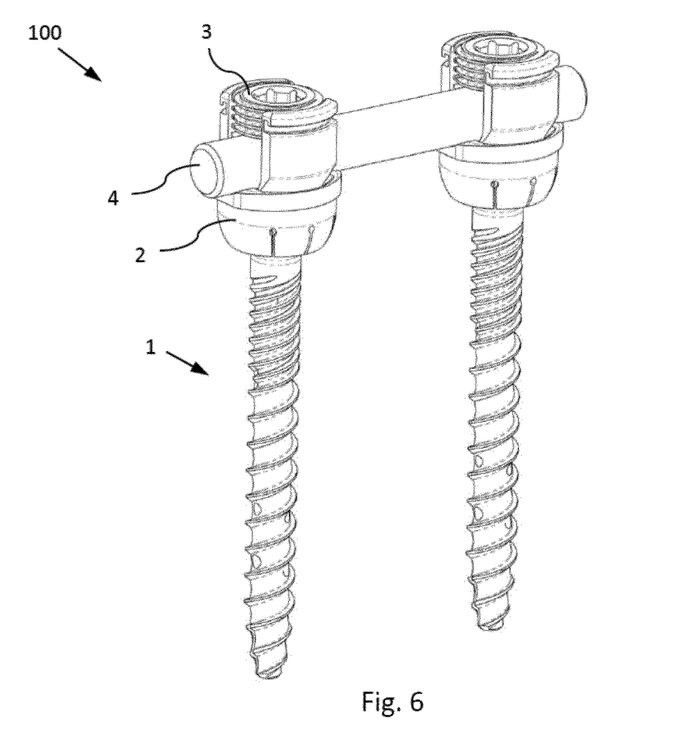
FIG. 6 two screw elements according to the invention in combination with u-shaped fork heads mounted with a connecting rod.

FIG. 6 shows two screw elements (1) according to the invention in combination with u-shaped fork heads (2) mounted with a connecting rod (4). The screw elements (1) have a proximal head area (10), which at least in part has a ball segment, which is configured to provide a polyaxially pivotable connection with a u-shaped fork head (2) in a side view. After the connecting rod (4) has been inserted and the adjusting means (3) has been fixed, the screw elements (1) are connected to each other in an angularly stable manner. They form a rigid fixation, as used for example in spinal surgery.

The invention claimed is:

1. A process for manufacturing a screw element comprising a shaft with a bone thread and a longitudinal central axis extending along the shaft and thereby defining a distal and a proximal direction, and the screw element further comprises a head, and a neck area and a tool attachment point is provided in the head, wherein at least three cantilever elements are attached to a proximal end of the head and said cantilever elements extend in the proximal direction beyond the proximal end of the head and are positioned mainly along the longitudinal central axis, the process comprising, comprising the steps:
   a. providing raw material particles of a Ti6Al4V alloy;
   b. additive building of the screw element by means of a 3D printing process, which joins the raw material particles together in three dimensions;
   c. stress relief heat treating the screw element at a temperature of at least 500° C., but not greater than 840° C., with a hold time of at least one hour, but less than 6 hours;
   d. removing cantilever elements from a proximal head area;
   e. second heat treating the screw element; and,
   f. removing incompletely joined raw material particles.

2. The process according to claim 1, wherein during the stress relief heat treating of the screw element a temperature of between 550° C. and 800° C. is set for the duration of the hold time.

3. The process according to claim 1, wherein during the second heat treating of the screw element, an argon atmosphere and a temperature between 900° C. and 940° C., is applied, and the screw element is exposed to a pressure of at least 900 bar, and for the temperature and the pressure a hold time of at least one hour but less than 4 hours is applied.

4. The process according to claim 3, wherein removing incompletely joined raw material particles further comprises:
   g. removing incompletely joined raw material particles by means of a mechanical removal process, and
   h. removing incompletely joined raw material particles by means of a chemical removal process.

5. The process according to claim 4, wherein the mechanical removal process is conducted by means of a blasting abrasive at a minimum application pressure of 2 bar and a minimum application duration of 5 min, wherein sharp-edged blasting abrasive is used, and the blasting abrasive comprises a particle size between 0.05 mm and 0.25 mm.

6. The process according to claim 4, wherein the mechanical removal process is conducted by means of a coarse barrel finishing or vibratory finishing process.

7. The process according to claim 4, wherein the chemical removal process is conducted by means of a pickling or etching treatment.

8. The process according to claim 7, wherein the chemical removal process is supported electro-galvanically and/or by mechanically induced vibrations.

9. The process according to claim 1, wherein during the second heat treating of the screw element, an argon atmosphere and a temperature of at least 920° C. but less than 1050° C. is applied, and a hold time of at least one hour but less than 4 hours is applied.

10. The process according to claim 1, wherein during the second heat treating of the screw element a temperature of at least 820° C. but less than 920° C. is applied, and a hold time of at least one hour but less than 4 hours is applied.

11. The process according to claim 1, wherein at the end of the process, the surfaces of the screw element are solidified by means of a blasting abrasive, wherein a minimum application pressure of 2 bar and a minimum application duration of 5 min are applied, wherein spherical blasting abrasives are used, and the blasting abrasive has a particle size between 0.05 mm and 0.25 mm.

* * * * *